United States Patent [19]
Elliott

[11] 4,054,842
[45] Oct. 18, 1977

[54] CHANNEL GAIN IMBALANCE COMPENSATION FOR FSK DEMODULATOR

[75] Inventor: William S. Elliott, Cedar Rapids, Iowa

[73] Assignee: Rockwell International Corporation, El Segundo, Calif.

[21] Appl. No.: 760,780

[22] Filed: Jan. 19, 1977

[51] Int. Cl.² .......................................... H03D 3/00
[52] U.S. Cl. .................................. 329/133; 329/104; 325/473
[58] Field of Search ................. 329/104, 112, 133; 328/163; 325/42, 65, 404, 473

[56] References Cited

U.S. PATENT DOCUMENTS

| | | | |
|---|---|---|---|
| 3,248,659 | 4/1966 | Giger et al. | 329/133 |
| 3,341,782 | 9/1967 | Aemmes | 329/112 |

Primary Examiner—John Kominski
Attorney, Agent, or Firm—Howard R. Greenberg; H. Fredrick Hamann

[57] ABSTRACT

Channel gain imbalance in a FSK demodulator for receiving binary data is ameliorated by developing D. C. compensating signals indicative of the imbalance through the energy contained within a predetermined bandwidth of the demodulation channel pair output signals and arithmetically combining them with the channel output signals to counteract the imbalance bias contained therein.

11 Claims, 1 Drawing Figure

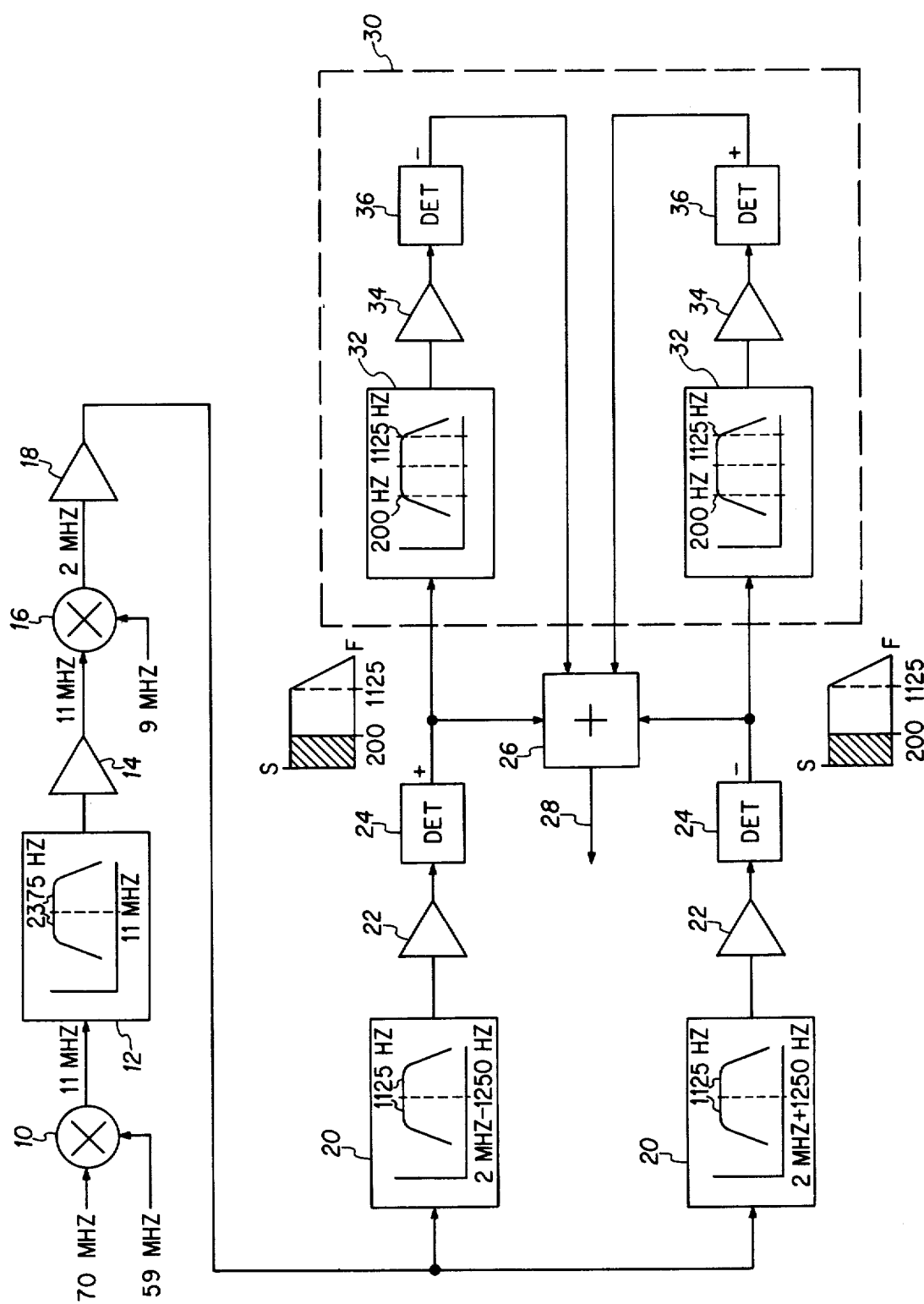

CHANNEL GAIN IMBALANCE COMPENSATION FOR FSK DEMODULATOR

BACKGROUND OF THE INVENTION

The subject invention, which was made under or in the course of a contract with the United States Air Force, pertains generally to electronics communications and particularly FSK demodulators.

A conventional technique for retrieving binary data transmitted as a frequency shifted keyed (FSK) signal is to separate the signal into the two frequency channels which define the mark and space information of each bit, normally logic states "1" and "0", respectively. The bandwidth of the individual channel filters which effectuate the separation should be wide enough to pass the data at the rate employed but sufficiently narrow to restrict noise components which would otherwise degrade performance and increase the bit error rate. With such a design, gain imbalance between the mark and space channels resulting from differing characteristics of like components in the individual channel paths is not usually a problem. Ideally, of course, equal gain in both channels is desired since then the noise contained in the channel outputs is cancelled so as not to introduce any unwanted bias when the outputs are combined to replicate the data bit stream. However, when the channel filter bandwidths have to be expanded beyond that necessary to accommodate the data rate, for example the Doppler effect when the communications equipment is located on a moving vehicle, the resultant gain imbalance effect on the noise components which are then enabled to pass through the channels may not be ignored since it can introduce a bias which materially contributes to bit error rate in the demodulation process. Although gain imbalance can be corrected by initial adjustment of the individual channel components under specified test conditions at a particular ambient temperature, temperature changes thereafter during operation may result in characteristic differences sufficient to produce unacceptable gain imbalance.

With the foregoing in mind, it is a primary object of the present invention to afford automatic channel gain imbalance compensation in an FSK demodulator.

It is a further object of the present invention to provide such channel gain imbalance compensation through a simple yet effective means.

The foregoing objects, as well as others, and the means by which they are achieved, may best be appreciated by referring to the Detailed Description of the Preferred Embodiment which follows hereinafter together with the single appended drawing which depicts the invention.

BRIEF DESCRIPTION OF THE INVENTION

In accordance with the stated objects, the subject invention affords channel gain imbalance compensation by developing a compensating D.C. signal for each channel indicative of the gain therethrough and combining the compensating signals with the channel data signals in a counteractive manner. The compensating signal is proportional to the energy contained within a predetermined bandwidth of its associated channel output data signal, preferably having a lower frequency greater than the data rate and an upper frequency less than one-half of the channel bandwidth. Each compensating signal is developed through a circuit comprising a serially connected filter which establishes the predetermined bandwidth of the energy of the channel output signal which is to be measured and an envelope detector which develops the D.C. signal that is fed back to an arithmatic means in the FSK demodulator used to combine the channel detector outputs for replicating the binary data bit stream. Each compensating signal is applied to the arithmetic means so as to counteract its associated output signal applied thereto.

DETAILED DESCRIPTION OF THE PREFERRED EMBODIMENT

For exemplary purposes only, the invention will be described in connection with the actual FSK demodulator in which it was developed, designed to receive an R. F. nominal FSK carrier signal of 70 MHz plus or minus 1250 Hz, respectively defining for each data bit a space or logic level "0" and a mark or logic level "1." The data rate employed is 75 bits per second (bps).

As shown in the appended drawing, the 70 MHz nominal R. F. carrier is first converted down to 11 MHz by mixing with a 59 MHz injection signal in mixer 10 after which it is applied to a bandpass filter 12 to eliminate unwanted noise and other undesired signals not within the desired signal passband. If the bandwidth of filter 12 were determined solely by the data rate, being 75 bps in the instant case, then as will be apparent to those skilled in the art, it could assume a value of approximately 400 Hz which would be sufficient to pass the five fundamental spectral components (the maximum lowest being 37.5 Hz for alternating 1's and 0's) of the desired signal wherein most of the energy of the data signal resides (applying the Sin X/X function). However, it may be necessary to expand the bandwidth of filter 12 to allow the desired signal to pass through when its actual frequency varies because of uncontrollable and unpredictable conditions. For example, when the transmitting and receiving positions are not fixed with respect to one another because one or both are located on a moving vehicle, such as an airplane, then the Doppler effect can cause the baseband frequency of 1250 Hz to shift plus or minus 925 Hz. Thus, to assure proper reception of the signal where the Doppler effect is a consideration, filter 12 must have a passband of about 4750 Hz equal to the sum of 2500 Hz to pass both channel carriers plus 1850 Hz for Doppler and 400 Hz for the desired signal bandwidth.

The output of filter 12 is increased to an operative level through amplifier 14 before being applied to a second mixer 16 wherein an injection signal of frequency 9 MHz converts it down to 2 MHz. After passing through another amplification stage 18, the nominal 2 MHz signal is separated into mark and space channels to retrieve the binary data. Each channel comprises a channel filter 20 serially connected with an amplifier 22 and an envelope detector 24 whose output affords a D.C. signal which is indicative of the binary state of each received bit. For example, assuming that a positive D.C. signal is synonymous with a mark or logic level "1" state and that a negative D.C. signal is synonymous with a space or logic level "0" state, then the upper path would constitute the mark channel and the lower path the space channel as shown. Thus, any time that a mark bit is received, the output of the upper detector 24 would be a positive D.C. signal while the output of the lower detector 24 would be zero. Similarly, any time that a space bit is received, the D.C. output of the lower detector 24 would be negative while that of the upper detector would be zero. Each detector 24 may be conventionally formed with a series diode whose output is connected to a lowpass filter such as a parallel resistor-capacitor combination Each filter 20 has a passband of 2250 Hz (1850 for Doppler plus 400 Hz for the desired signal) centered about 2 MHz minus 1250 Hz for the upper and 2 MHz plus 1250 Hz for the lower to allow the passage of the desired mark or space signal with the Doppler effect superimposed thereon.

The outputs of detectors 24 are applied to an arithmetic means 26 such as a summing operational amplifier which merely adds them together so as to replicate the transmitted binary data bit stream at its output 28. It is to be realized that the detector 24 outputs would be arithmetically combined through a subtracting circuit rather than an adder when a unipolar signal arrangement was employed rather than the bipolar arrangement depicted herein (so as to cancel noise). As may be appreciated by looking at the frequency spectrum diagram (approximated for illustrative purposes only) for the output signals of detectors 24 in the appended drawing, a large amount of noise energy is contained in the frequency range above the maximum 200 Hz frequency necessary to identify the desired data signal as a result of the need to accommodate the Doppler effect. With the gain of the mark and space channels exactly matched, the noise contained in the extended frequency range has no adverse effect, since it is cancelled out in the arithmetic means 26. However, as the channel gains differ, such as by temperature variations which may affect their individual component characteristics differently after some initial adjustment, the imbalance in amplified noise introduces a D.C. bias into the arithmetic means 26 which results in a higher bit error rate.

The foregoing channel gain imbalance problem is obviated herein by a compensating means 30 comprising a pair of like compensating circuits, each consisting of a bandpass filter 32 serially connected with an amplifier 34 and envelope detector 36. Each filter 32 is connected to the output of a different one of the detectors 24 to permit a D.C. signal to be produced at the output of its associated detector 36 proportional to the energy contained within a predetermined frequency range of its associated detector 24 output signal allowed to pass through filter 32. Each filter 32 preferably has a lower cutoff frequency greater than the data rate and in particular greater than the fifth harmonic thereof so that the data signal itself does not afford any compensation (so as to avoid bias compensation resulting from a string of consecutive 1's or 0's). The upper cutoff frequency of each filter 32 is preferably less than one-half of the channel filter 20 bandwidth so that no unnecessary noise energy is introduced. This results in a bandwidth of about 900 Hz for filter 32 (1125-200 Hz). The output of each detector 36 will thus be seen to be proportional to the energy contained in the output signal of its associated detector 24 outside of the desired data signal baseband frequency range but within the frequency range of the noise which passes through in order to accommodate the Doppler effect. The noise energy level which is assumed uniform throughout the frequency range, is then used as a measure of the gain encountered in traversing each channel comprising filter 20, amplifier 22, and detector 24.

The outputs of detectors 36 are applied to the arithmetic means 26 so that each counteracts the output signal of the associated detector 24. Accordingly, each compensating signal has a polarity opposite to that of its associated detector 24 output. Thus, as the output of one or the other of detectors 24 increases as a result of increased gain in its respective channel its associated detector 36 will counteract it so as to neutralize the channel gain imbalance.

In addition to adjusting the signal to an operative level, amplifiers 34 may be advantageously employed to provide compensation for noise over the entire bandwidth of the channel filters 20 even though the compensating signal at the outputs of the detectors 36 is dependent upon the more limited frequency range above the data rate. This may be accomplished by setting the gain of amplifiers 34 equal to the ratio of the bandwidth of channel filter 20 to that of compensating circuit filter 32. In the instant case, this would result in an approximate gain factor of 2.5 equal to 2250/900.

Thus, as the foregoing demonstrates, the subject invention affords a simple but effective means of providing channel gain imbalance compensation for FSK demodulators. Since undoubtedly the preferred embodiment can be modified by those skilled in the art without departing from the scope and spirit of the invention, the foregoing Detailed Description herein is intended to be merely illustrative and not circumscriptive of the invention as it will be claimed hereinbelow.

What is claimed is:

1. In combination with an FSK demodulator having a pair of bandwidth limited channels formed with a pair of envelope detectors for providing D.C. output signals indicative of binary data and an arithmetic means for arithmetically combining the detector output signals to replicate the transmitted data bit stream, a gain imbalance compensating means, comprising:

a pair of compensating circuits, each being connected to the output of a different one of the pair of detectors for providing a D.C. compensating signal proportional to the energy contained within a predetermined bandwidth of its associated detector output signal, and means for applying the compensating signals to the arithmetic means such that each counteracts its associated detector output applied thereto.

2. The compensating means of claim 1 wherein the lower frequency of said predetermined bandwidth is greater than the data rate.

3. The compensating means of claim 2 wherein the upper frequency of said predetermined bandwidth is less than one-half of the channel bandwidth.

4. The compensating means of claim 3 wherein each of said compensating circuits includes a serially connected bandpass filter and envelope detector for affording the compensating signal.

5. The compensating means of claim 4 wherein each of said compensating circuits includes an amplifier for amplifying the compensating signal by an amount equal to the ratio of the bandwidth of its associated bandpass filter to the bandwidth of its associated channel.

6. A method of providing gain imbalance compensation in an FSK demodulator having a pair of bandwidth limited channels formed with a pair of envelope detectors for providing D.C. output signals indicative of binary data and an arithmetic means for arithmetically combining the detector output signals to replicate the transmitted data bit stream, comprising:

generating a pair of D.C. compensating signals, each being proportional to the energy contained within a predetermined bandwidth of a different one of the detector output signals, and applying said compensating signals to the arithmetic means such that each counteracts its associated detector output applied thereto.

7. The method of claim 6 wherein the lower frequency of said predetermined bandwith is greater than the data rate.

8. The method of claim 7 wherein the upper frequency of said predetermined bandwidth is less than one-half of the channel bandwidth.

9. A FSK demodulator for replicating a binary data bit stream from a FSK signal, comprising:

a pair of mark and space channels, each having a serially connected bandpass filter and envelope detector for receiving the FSK signal and providing at the detector output a D.C. signal whenever a received bit conforms to its associated binary state;

arithmetic means for arithmetically combining the outputs of said channel detectors to replicate the transmitted data bit stream;

a pair of compensating circuits, each being connected to the output of a different one of said channel detectors and including a serially connected bandpass filter and envelope detector for providing at the output of said detector a D.C. compensating signal proportional to the energy contained within a predetermined bandwidth of its associated detector output signal, and means for applying the compensating signals to the arithmetic means such that each counteracts its associated detector output applied thereto.

10. The demodulator of claim 9 wherein the lower frequency of said predetermined bandwidth is greater than the data rate.

11. The demodulator of claim 10 wherein the upper frequency of said predetermined bandwidth is less than one-half of the channel bandwidth.

* * * * *